Nov. 18, 1924. 1,516,409
A. A. SCOTT
APPARATUS FOR AUTOMATICALLY SWITCHING BRICK INTO PLURALITY OF ROWS
FOR UNIT FORMATION
Filed Jan. 5, 1923   10 Sheets-Sheet 1

Inventor
Alexander A. Scott
James R. Hodder
By
Attorney

Nov. 18, 1924. 1,516,409
A. A. SCOTT
APPARATUS FOR AUTOMATICALLY SWITCHING BRICK INTO PLURALITY OF ROWS
FOR UNIT FORMATION
Filed Jan. 5, 1923 10 Sheets-Sheet 7

Inventor
Alexander A. Scott
By James R. Hodder
Attorney

Patented Nov. 18, 1924.

1,516,409

UNITED STATES PATENT OFFICE.

ALEXANDER A. SCOTT, OF KNOXVILLE, TENNESSEE, ASSIGNOR TO BALTIMORE TRUST COMPANY, TRUSTEE.

APPARATUS FOR AUTOMATICALLY SWITCHING BRICK INTO PLURALITY OF ROWS FOR UNIT FORMATION.

Application filed January 5, 1923. Serial No. 610,813.

*To all whom it may concern:*

Be it known that I, ALEXANDER A. SCOTT, a citizen of the United States, and resident of Knoxville, in the county of Knox and State of Tennessee, have invented an Improvement in Apparatus for Automatically Switching Brick into Plurality of Rows for Unit Formation, of which the following description, in connection with the accompanying drawings, is a specification, like letters on the drawings representing like parts.

My present invention is a novel process and apparatus for handling brick during the process of manufacture, forming the brick into any desired number of rows and lengths for subsequent unit handling.

While my invention is primarily intended for use in handling green brick, as the same is manufactured by a continuous process, from a die machine, and while travelling on a conveyor belt, and as a portion of automatic and continuous brick handling methods from die machine to kiln; the invention is equally applicable to the handling of burned brick or similar articles where it is desired to form the same into predetermined rows, units or the like for subsequent handling.

In the operation of brick manufacture, as usually carried out in the stiff mud process, one or more clay columns are cut into brick lengths, and heretofore it has been necessary, in actual commercial work, to remove these brick from the pallet by hand. Numerous efforts have heretofore been made to provide automatic lifters, machines and the like, to pick up such brick from the conveyor belt and handle them into units for drying and hacking, but such prior methods have not been sufficiently commercial to be in general use. My invention aims to obviate the difficulties heretofore experienced in the methods and apparatus for picking up, lifting, and handling these green brick to form the same into units for drying, hacking and handling, and to form such units directly during the conveying or travelling action of the brick or columns of brick. To this end I provide novel and simple means to divert predetermined units of brick from the clay columns, into a series of rows or columns, sufficient in number, in spacing from each other, and in length, to the unit of brick for the layer or layers to be built into hacked relation. I believe that this feature of having means automatically operated to thus divert predetermined units of brick, into desired rows or columns, is distinctly new, and I wish to claim the same broadly.

Important features of my present invention consist in the provision of means which will receive continuous columns of brick units just as they come from the conveying belts and at high speed, without injury to the plastic sides or portions of the green brick, and to divert the same into even or uneven numbers of rows or columns, automatically, and in proper timed relation for the subsequent movement of the entire series of rows into units, all maintained in spaced relation for the drying or hacking of the green brick. This automatic means consists primarily in a switching table or apparatus, which is equally useful in forming a unit comprising a plurality of columns of brick if handling burned brick, but is of particular value in the process of manufacture of green brick, as the apparatus does not injure, mar or distort the soft sides, edges, corners, etc., of the green brick.

One of the special features of my present process and apparatus consists in the arrangement of loading a pivotal table whereby a plurality of rows of brick, and a brick in each row, can be fed or conveyed into a table, as by gravity, and thereupon the table itself rocked on its pivots and positioned horizontally for subsequent removal by any suitable overhead clamp or carrier. Important features in connection with this arrangement are illustrated and described herein, consisting in automatic stopping devices, automatic releasing apparatus, and means for the realining of the pivotal carrier after the removal of a unit of brick thereon. I also prefer to use such pivotal carrier as the means for forming the unit to be removed, for this purpose making the carrier of appropriate size, in length and width to receive the plurality of rows of bricks desired and of the number of bricks in each row.

Further important features, advantages and novel combinations of parts will be hereinafter more fully pointed out and claimed.

Referring to the drawings, illustrating a preferred embodiment of my invention.

A modification of the switching devices is illustrated in Figs. 19, 20, 21, 22, 23, 24, and 25.

Figure 1:
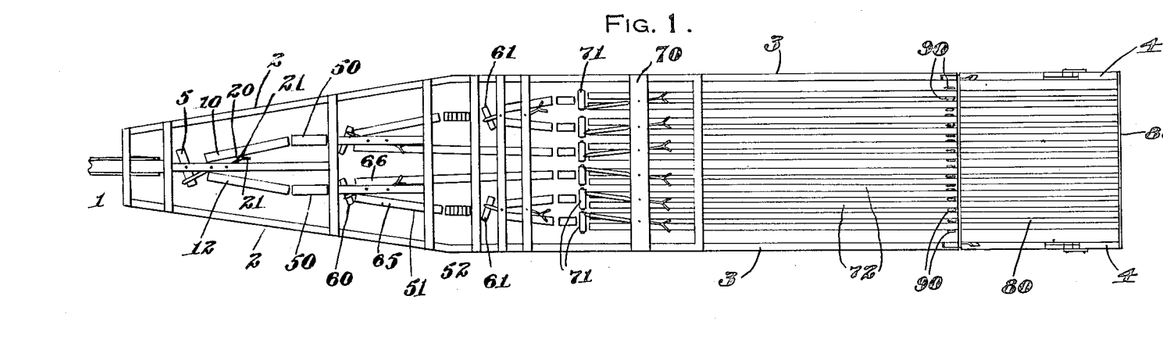
Fig. 1 is a plan view showing in conventional form the general arrangement of switching devices, collecting tables and unit receiving and building means.
Figure 2:
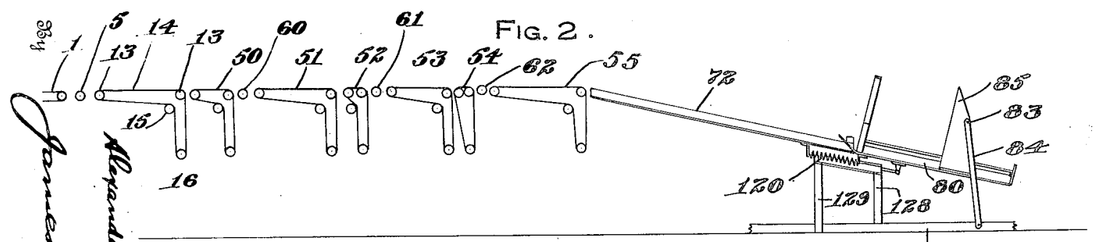
Fig. 2 is a fragmentary diagrammatic side view illustrating the conveying instrumentalities cooperating with the switching arrangements and means to form the series or rows of columns of brick.
Figure 7:
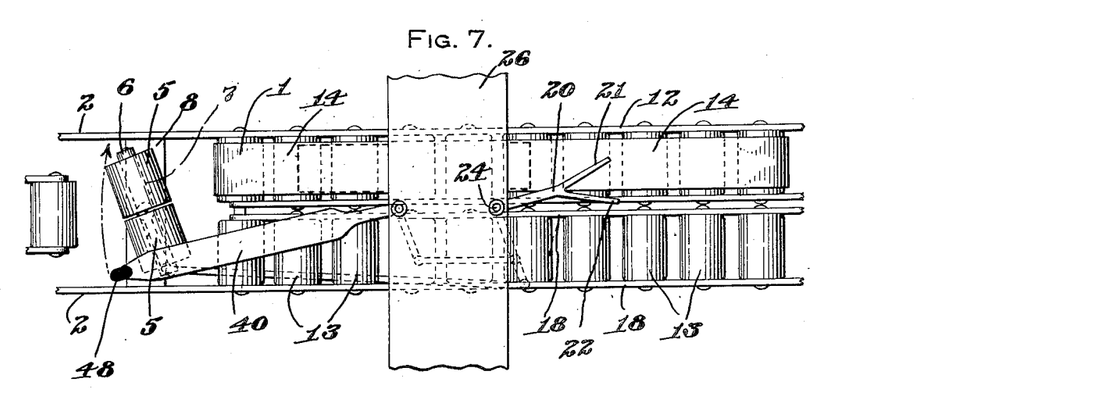
Fig. 7 is a plan view of one of the switching devices.
Figure 8:
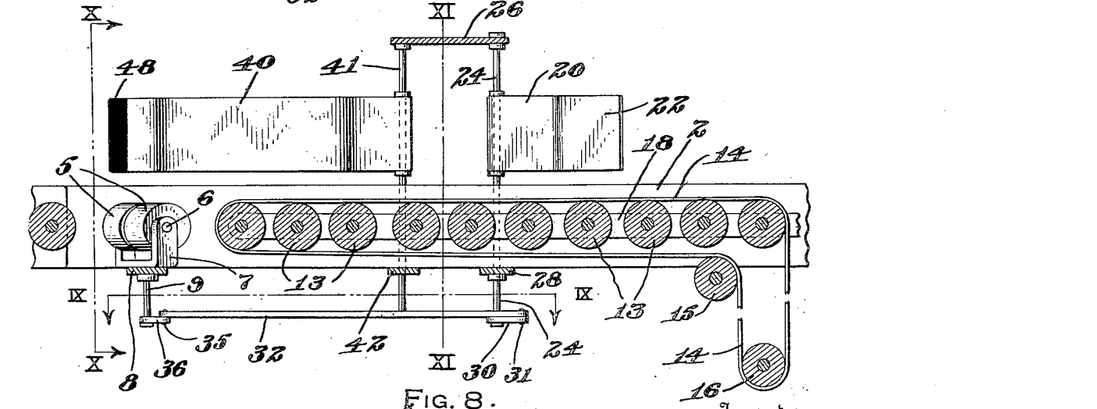
Fig. 8 being a corresponding side view shown partly in longitudinal cross-section of Fig. 7.
Figure 9:
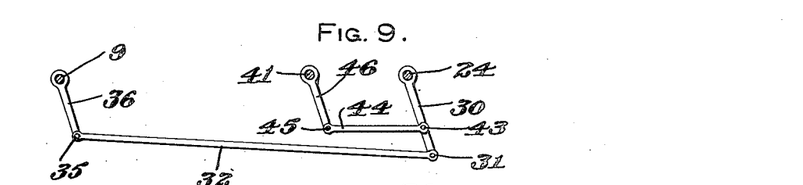
Fig. 9 is a fragmentary cross-sectional view of the switch controlling levers on the line 9—9 of Fig. 8.

As illustrated in the drawings, my present improved apparatus consists in means adapted to receve brick—preferably green brick—just as they are delivered and in irregular timed relation from the offbearing belt of a stiff mud machine, this belt being indicated at 1, Figs. 1 and 2. Cooperating with this delivery belt I position my apparatus which may and preferably does consist of a suitable framework designated generally at 2, 2, throughout the switching portion, which widens as successive brick are conducted into parallel rows, thence the framework 3, 3, runs parallel and preferably with a downward inclinaton to secure the benefit of gravity feed, to the pivotal cradle, which latter is pivoted on a separate framework and pivoted supporting frame portions designated generally at 4, 4. Throughout the switching portions I prefer to utilize series or sets of positively driven conveyor belts, these being endless belts of suitable length and width and in proper lateral position to receive and transport the brick positively from one switching element to the succeeding switching element or to the final row or column in which the brick is to fall to form the unit in the pivoted cradle. This belt arrangement is graphically illustrated in Fig. 2, wherein the various conveying belts are shown around suitable rollers. A description of one of these belts will suffice for all. Thus, adjacent the offbearing belt 1 is a switching roller 5, which roller or rollers—shown in Figs. 7 and 8, as a pair of rolls—is mounted on a shaft 6 carried by a fork 7, which fork is centrally pivoted to a crossbar 8 connected with the frame 2, said central pivot extending downwardly as shown at 9, and is adapted to be partially rotated on its pivot during the switching operation to facilitate the transfer and change in direction of oncoming brick from the column 10 to the column 12, this constituting the first switching operation to separate the single row of bricks into a plurality of parallel rows for the unit formation. These columns 10 and 12 may be parallel as illustrated in Fig. 7, or may be slightly divergent as better shown in Fig. 1, and comprise a plurality of rollers 13, 13 on which the belt 14 is led around suitable guide tension and driving rollers 15 and 16. This is substantially the arrangement for the conveying belts 14 in each instance where a positive belt or driving and conveying means is utilized for transporting the brick. In Fig. 7 the belt 14 is illustrated at one side of the rollers with the belt removed as shown in the parallel column. These rollers are suitably mounted between the frame portions 2 and an inner support 18.

To effect the switching operation and to actuate the partial rotation of the rollers 5, I provide a swinging member 20 having forked ends 21 and 22, the latter adapted to project into the column 10 or the column 12, depending upon the position of the same, and to be struck by a passing brick and thereby moved out of position by the brick itself as it is conveyed along either column by the moving belt. This switch 20 is mounted on a shaft 24 pivoted between crossbars 26 and 28 extending to the side frames, or otherwise as desired, the rod 24 having rigidly keyed thereto an arm 30. This arm in turn is pivoted at 31 to a rod 32, extending forwardly adjacent the pivotal roll 5, to which it is connected by a pivot 35 and arm 36 keyed to the shaft 9 on which the fork 7 and consequently the switch roll 5 turns. Consequently a brick traversing the belt 14 down the upper channel or column 10, see Fig. 7, will strike against the wing 21 of the switch 20 and force the same out of its path, thereby rocking the shaft 24 and through the connections of the arms 30, 32 and 36 similarly rocking the pivot 9 and turning the rolls 5 in angular position to aid in switching and conducting the succeeding oncoming brick, diverting it to the other column 12.

In order to aid this diverting or switching of the succeeding brick and to insure its being diverted as desired, I provide a positive switching guide 40. This guide 40 is also pivoted to a shaft 41 held between the cross plate 26 and crossbar 42, or otherwise pivoted. To operate the switching guide 40 in timed relation with the action of the switching roller 5 and member 20, I also pivot to the swinging arm 30 at 43 a link 44, which in turn is pivoted at 45 to the arm 46, keyed to the shaft 41 carrying the guide 40. Consequently both the guide 40 and roll or rolls 5 are turned and swung in simultaneous switching action through the operation of the member 20. This actuation is immediate and sufficiently quick to take place in the normal spacing of successive brick as they are delivered from the offbearing belt 1. If desired the brick could be previously and properly spaced on the offbearing belt 1 by any suitable or desirable separating means in order to cooperate more fully in timed relation with the switching devices above described. In the front of the guide 40 I may position a rubber bumper 48, which would prevent injury or damage to soft and green brick. It will thus be seen that this switching arrangement is automatic and will successively divert following brick into desired columns, a passing brick setting the switch to insure the succeeding or following brick going in a reverse manner. With the brick thus separated and following along the successive positive belt conveying and driving members in each column, illustrated in Figs. 1 and 2, and the belts I will here designate generally as 50, 51, 52, 53, 54 and 55, the cooperating intermediate switching rollers being designated at 60, 61 and 62. These belts, it being understood, will be in suitable driven surface speed.

Figure 10:
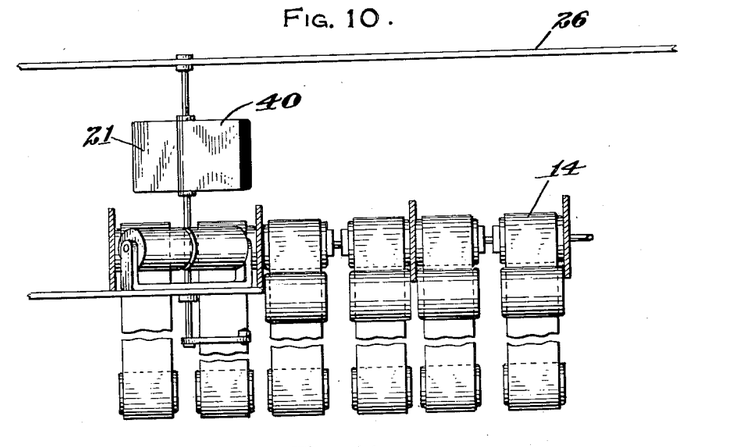
Fig. 10 is a cross-sectional view on the line 10—10 of Fig. 8 looking in the direction of the arrows.
Figure 11:
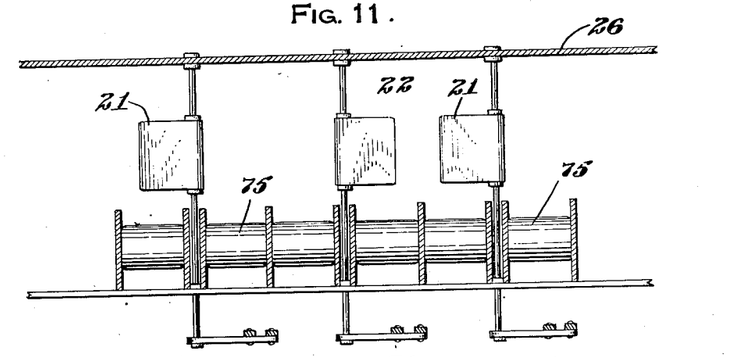
Fig. 11 is a view, partly in cross-section, on the line 11—11 of Fig. 8.
Figure 12:
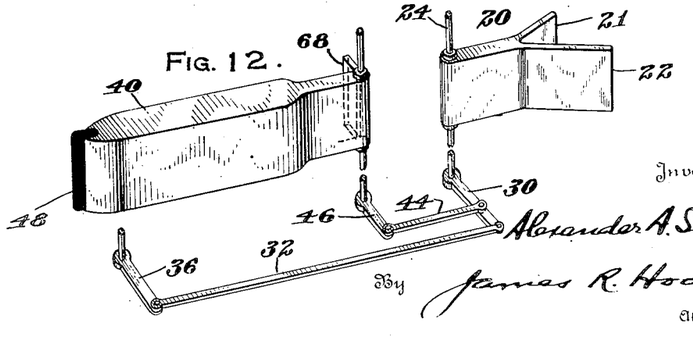
Fig. 12 is a fragmentary perspective view of a switching member and the operating levers.
Figure 13:
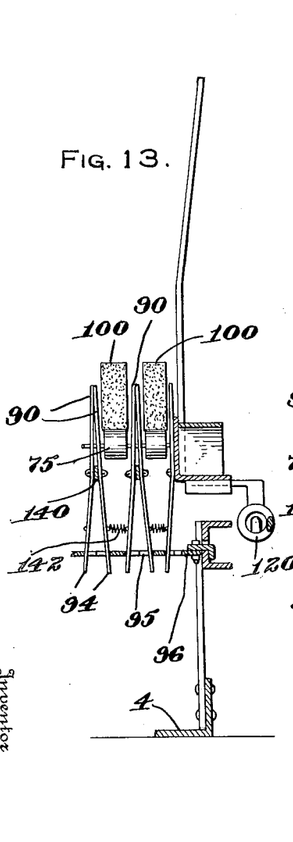
Fig. 13 is a view on the line 13—13 of Fig. 3, looking in the direction of the arrows.

The switching device above explained would be sufficient if an even multiple of columns were desired, as the first column being divided into two, either succeeding column can be divided into two more, and thus an even number of columns for a unit formed. It may, however, be desired to have an uneven number of columns, depending on the setting for the unit, size and dimensions of the same. To this end I provide means which will afford an unequal switching of a column of brick, permitting two brick to pass before the switch is turned for a succeeding switching operation, diverting the third brick down one column, while two brick have passed along one of the columns. This arrangement also permits me to render the entire device more conveniently arranged and compact, by diverting the two main central columns of separated brick to the center of the apparatus after a plurality of columns have been formed, and diverting the outside columns for subsequent separation into a further plurality of columns. This arrangement is best illustrated in Figs. 10, 11 and 12. I utilize the same arrangement of combined switching roller and guide as above explained, and as further illustrated in Fig. 12 for these rollers. I therefore have designated the switching guide in each instance as 40 and the switching member as 20 with the wings 21 and 22, the latter being mounted on rock shafts and connected with cross-bars as already explained. Thus at the switching rollers 60 I may arrange the same to divide the column 12 into two columns 65 and 66, switching one brick down the column 65 through the passage of a brick. Thereupon the switching roller 60 and guide member 40 will require two movements of successive brick down the column 66 to turn the switch backwardly for the switching of another single brick down the column 65. This is effected by having two wings on the members turning the roller 60, the first wing 21 when struck by a passing brick, only partially moving the levers and guide 40 and simultaneously bringing a second wing into position to be struck by the next brick, which latter completes the turning of the switch. Thus as shown in Fig. 12, the switching member 20 with its wing 21, formed relatively short, when struck by a passing brick, will only swing the same partially through the cycle necessary to operate the arms and links 30, 32 and 36 to turn the roll 60 and its cooperating guide member 40, this partial swinging movement bringing a second short wing 68 into position to be struck by the succeeding brick and thus complete the swinging action. For the return of the switch by the passage of a single brick down the channel 65, the wing 22 may be made of sufficiently greater length to effect the complete rocking, lever actuating and switching action by the passage of a single brick.

Figure 3:
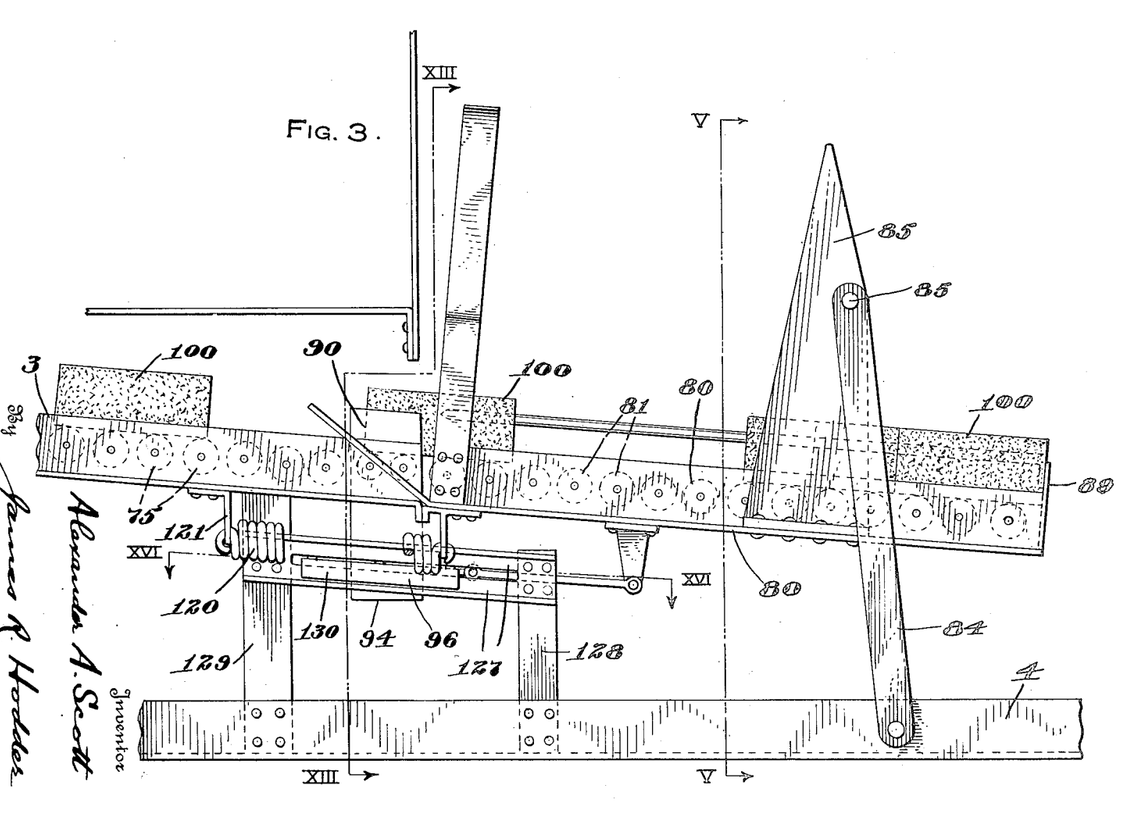
Fig. 3 is an enlarged side view of the pivotal carrier on which the unit is formed.
Figure 4:
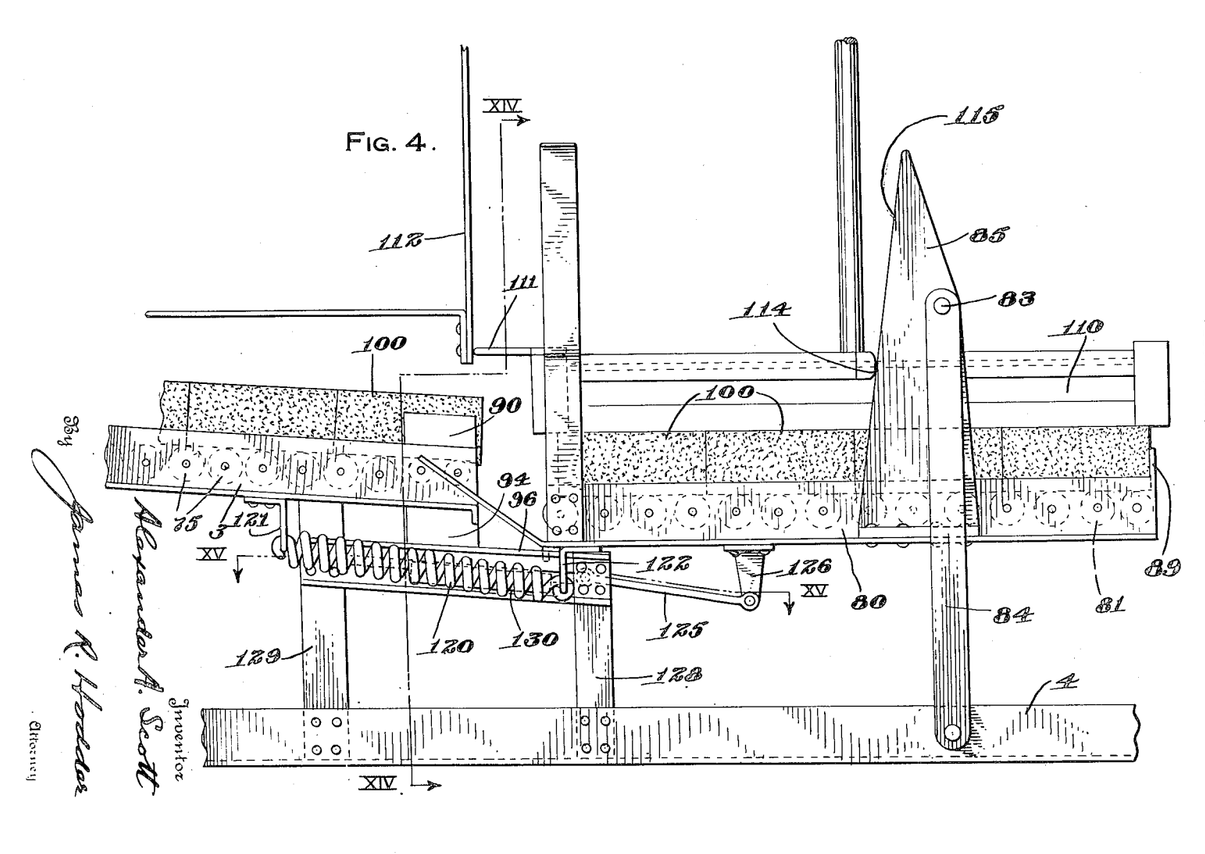
Fig. 4 is a side view illustrating the pivotal carrier in horizontal position and with the columns of oncoming brick stopped.
Figures 5, 17, 18:
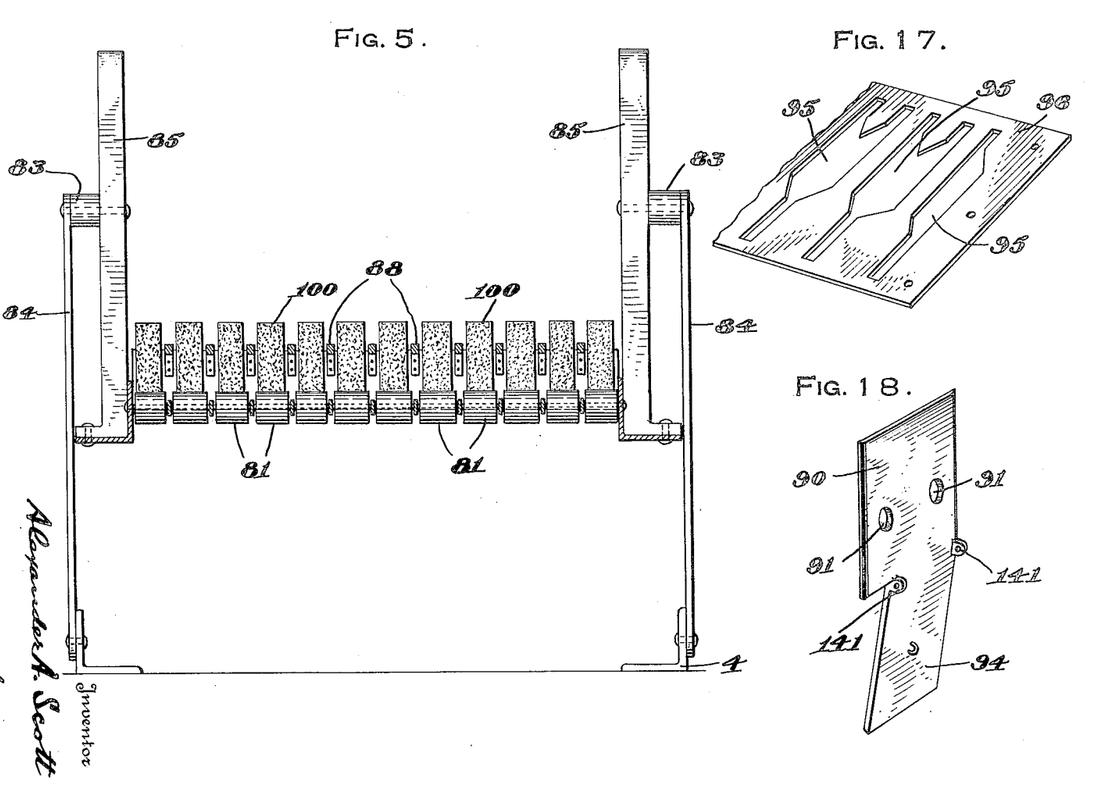
Fig. 5 is a cross-sectional view on the line 5—5 of Fig. 3.
Fig. 17 is a fragmentary perspective view of the clamp spreader plate in connection with the brick clamping devices illustrated in Figs. 13, 14, 15, and 16.
Fig. 18 is a perspective view of the brick contacting clamp which is thrown into clamping and releasing positon by a relative movement with the spreader clamp plate of Fig. 17.
Figure 6:
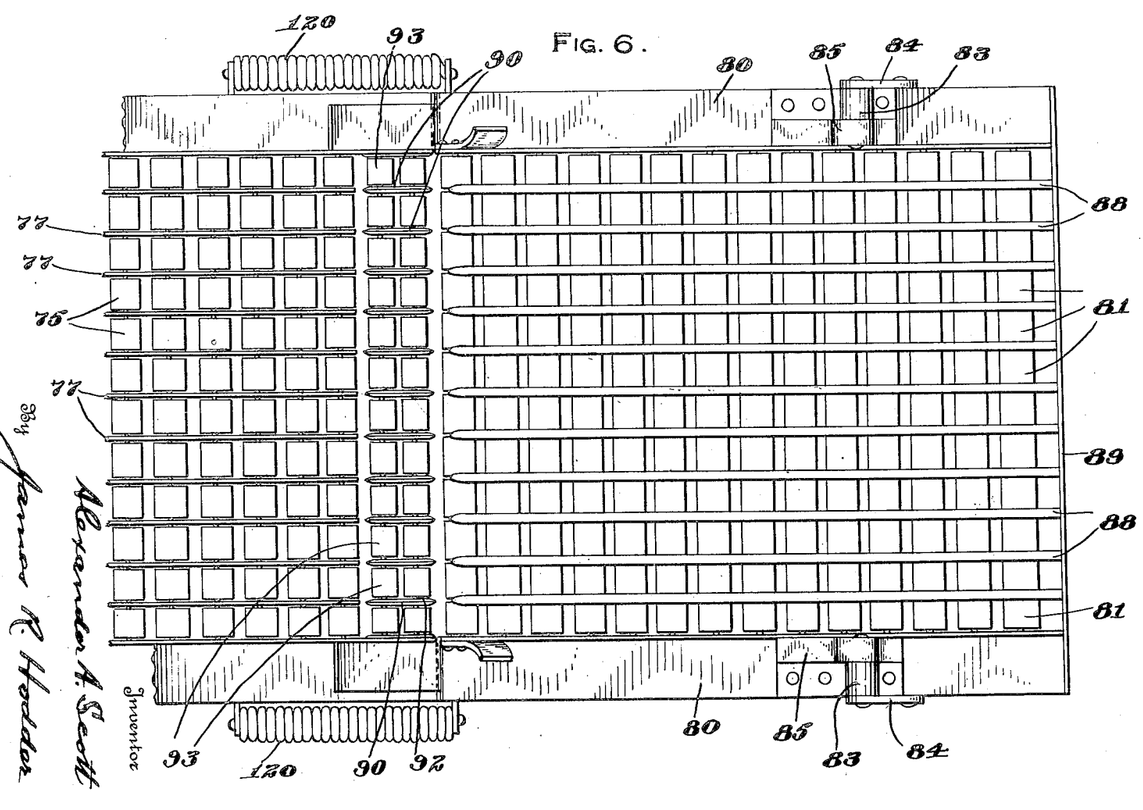
Fig. 6 is a plan view of the pivotal carrier and the adjacent conveyor feed bricks topping means, etc.
Figures 14, 15:
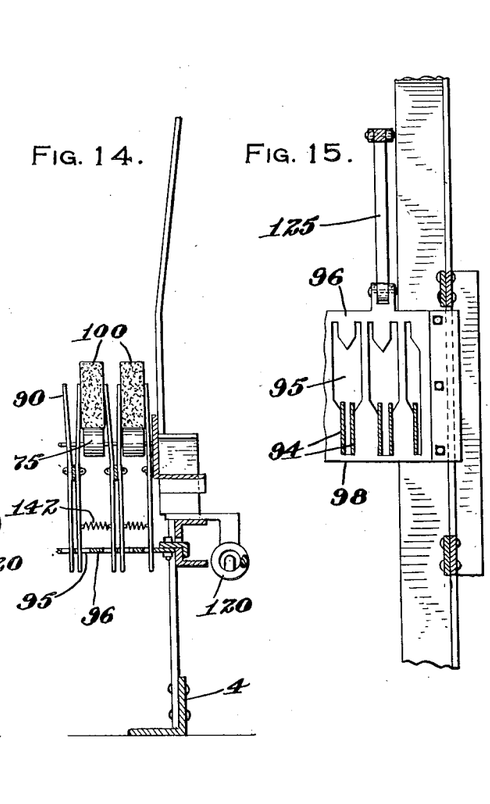
Fig. 14 is a view on the line 14—14 of Fig. 4.
Fig. 15 is a cross-sectional view on the line 15—15 of Fig. 4.
Figure 16:
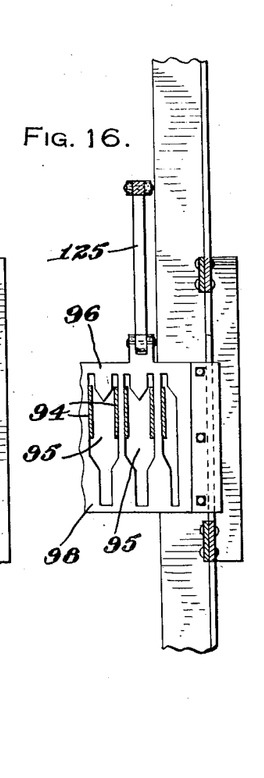
Fig. 16 is a view partly in cross-section on the line 16—16 of Fig. 3.

With the columns of brick thus separated in any desired multiple, even or uneven, they are conveyed downardly through a final set of switching members, which may be simple switches pivoted to the cross-bar 70 without the necessity of turning the rollers 71 for the final dividing or switching action, any one of which switches can if desired be disconnected or fixed in one guiding path, where an uneven multiple is desired; the brick then reach the section 3 which preferably has the desired number of columns and which I have indicated at 72, this portion of the apparatus dispensing with positive driving belts and relying upon a series or set of rollers for gravity transporation of the brick. Here the columns of brick may collect into a sufficient length in each column to give an over supply for the unit to be formed in the pivoted cradle. Each of these columns and sets of rollers (see Fig. 6, wherein the rollers are designated generally at 75 and the divisions dividing the brick into columns are shown at 77) terminate in a clamping station or stop means. This clamping station is adapted to automatically catch, hold and clamp the first brick in each column as it reaches this position, after the unit is formed upon the pivoted table and the table itself which is first in alinement whith the angle of inclination of the gravity portion 72 (see Fig. 3) is straightened or moved horizontally preparatory to the lifting of the unit or other unit removing instrumentality. Therefore these clamps must be automatically actuated, and furthermore be actuated instantly when the pivoted cradle 80 is moved out of alinement or position so that the succeeding weight and movement of the columns of brick will be stopped. It should be noted that the cradle 80 is provided with a plurality of gravity rollers 81 similar to the gravity rollers 75 in the inclined column 72 of the section 3 of the apparatus. This cradle is pivotally supported at 83 to arms 84 secured to the frame 4, the pivots 83 supporting the cradle by upstanding side portions 85. I have designated the brick throughout as 100 and as these brick move over the gravity roller 75 down the inclined column 72, and cross the clamping station or position into the cradle, they continue their movement over the gravity rolls 81 of the cradle in the corresponding columns, each column rollers being divided by suitable partitions 88, until the first brick strikes the end or outer flange 89 of the cradle 80, whereupon it stops and the succeeding brick abut against it. The cradle 80 is of appropriate length to receive a predetermined number of brick until each column of the cradle is full. As herein shown this cradle is adapted to receive a unit of brick twelve columns wide, appropriately spaced for drying, hacking or burning as desired, and four brick long. This gives the desired setting when successive units are set in layers at right angles to each other of "three over four". With the cradle filled and in its angular position as shown in Fig. 3, it is then advisable to straighten or position the cradle horizontally for subsequent lifting, removal or other handling of the unit thus formed. It is at this moment that the clamps are automatically actuated to hold and retain the succeeding brick, if any, in each of the columns 72 on the collecting table in the portion 3. In order to straighten the table 80, I prefer to so manipulate or swing the same that it will be horizontal, thus moving it spaced somewhat from the receiving position shown in Fig. 3, swinging or rocking it on the links 84 and it is this supporting movement of the cradle 80 from the previous position which I utilize to actuate automatically the brick engaging clamping devices 90. Positioned between each of the sets of rolls 75 and in alinement with the partition 77, I provide a pair of these brick clamps 90, each pair taking substantially the same space as that of the partition 77, as clearly shown in Fig. 6. These brick clamps are plates of spring metal, see Fig. 18, and are provided with holes or recesses 91 to receive the axles 92 of the set of rolls 93 constituting the continuation of the gravity rolls 75. These plates have downwardly extending wings or portions 94 adapted to fit within slots 95 in an actuating plate 96 positioned underneath. This plate is moved longitudinally with the movement of the cradle 80, and the cam slots 95 formed thereon acting on the depending wings 94 of each of the clamping spring plates 90 act first to spring these plates apart underneath and therefore toward each other above where the portions 90 are in position to engage the brick 100, see Fig. 14, and conversely to release this clamping action when moved in the reverse direction, see Fig. 13. These cams 95 are so formed, and as shown in Figs. 13, 14, 15, 16 and 17, to spring each pair of plates in brick clamping position when moved with the cradle 80, separating the cradle from its receiving position, the wings then being forced into brick clamping position at the end 98 of the plate 94 as illustrated in Fig. 15, the reverse movement releasing the same and spreading these plates as will be readily understood on inspecting Fig. 16. Consequently the instant that the cradle 80 is filled and moved or rocked into horizontal position, these clamps 90 will be actuated to hold the succeeding brick 100 (see Fig. 4) and all following brick thereagainst. After the unit thus formed has been removed and the cradle 80 is positioned in alinement with the column 72, the plates 96 are moved into clamp releasing position and hence the bricks 100 held by these clamps will be simultaneously released and will move by their own weight over the rollers 75 and the rolls 81 in the cradle, filling the cradle automatically.

In order to effect the rocking movement to and fro of the cradle 80 and preferably of the cradle automatically into brick receiving position at an angle and in alinement with the column 72, I so construct and arrange the cradle and its rocking links 84 so that an overhead clamp designated generally at 110 when lowered into position on the unit formed in the cradle 80, will tend to straighten the cradle separating and rocking it into horizontal position by engagement of a member 111 on a fixed frame 112 and the corresponding engagement of a lug 114 on the beveled face 115 of the upstanding portion 85. This clamp 110 may be of any desired or suitable brick lifting clamp construction, engaging the spaced rows of brick and lifting and removing them for hacking or setting alternate layers on drier cars or the like. The cradle being pivoted on the links 84 will readily rock and swing into horizontal position and to return the cradle automatically I provide a pair of coiled springs 120, having one end rigidly secured to a lug 121 carried at each side of a part of the frame 3. The other end of said spring is secured to a corresponding lug 122 on the bottom of the cradle 80. These coiled springs are normally under sufficient tension to rock the cradle on the links 84 holding it firmly in abutting position against the rollers 72 in the same angular position as above explained. To effect the reciprocation of the plate 96 I attach the same to a link 125 which latter is pivoted to a stud 126 on the cradle, thus effecting reciprocation of the same, this plate sliding in guideways 127 supported between posts 128 and 129 at each side of the framework, these plates having overhanging flanges 130 to hold them in position.

While the clamping plates 90 may be swung on the axles and actuated as explained, I prefer to secure the same in pairs by small lugs 140 secured to ears 141 on each plate, and furthermore I prefer to provide coiled springs 142 between each adjacent pair to effect a quick releasing and automatic opening or unclamping of the brick 100 as soon as the cradle is in position and even before the plate 96 has made its complete traverse. This enables the loading operation to be speeded up considerably and facilitates rapidity of operation of the entire apparatus.

Figure 19:
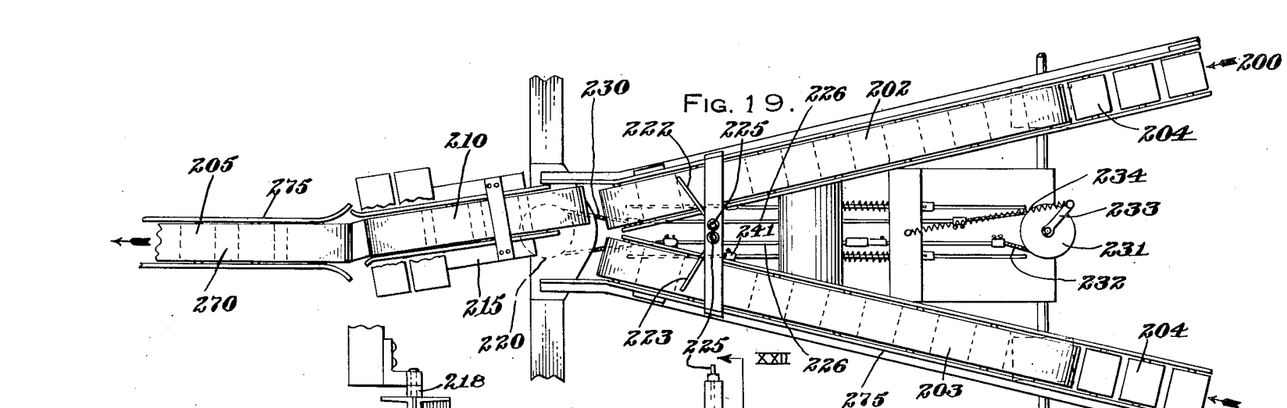
Figure 20:
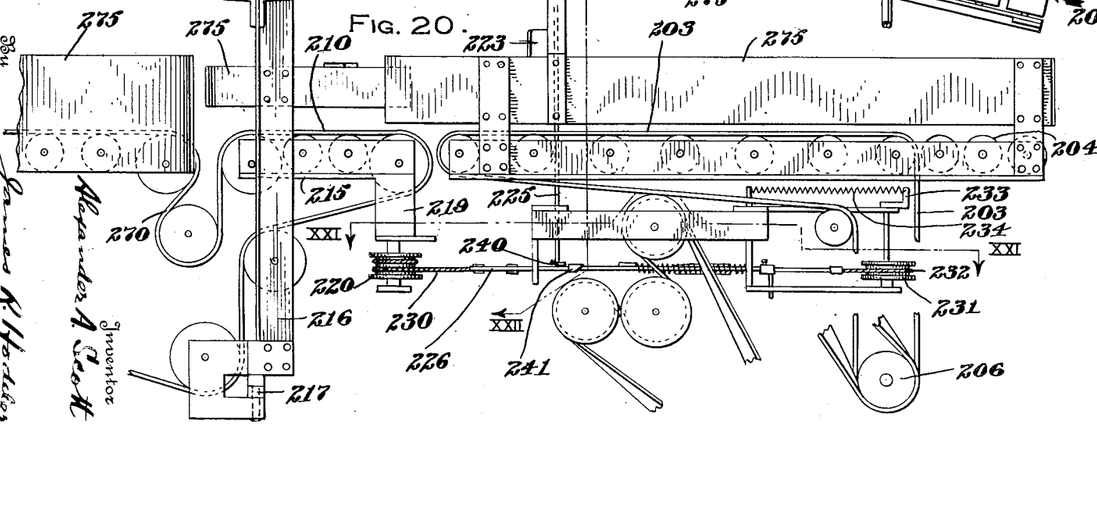
Figures 21, 22, 23, 24, 25:
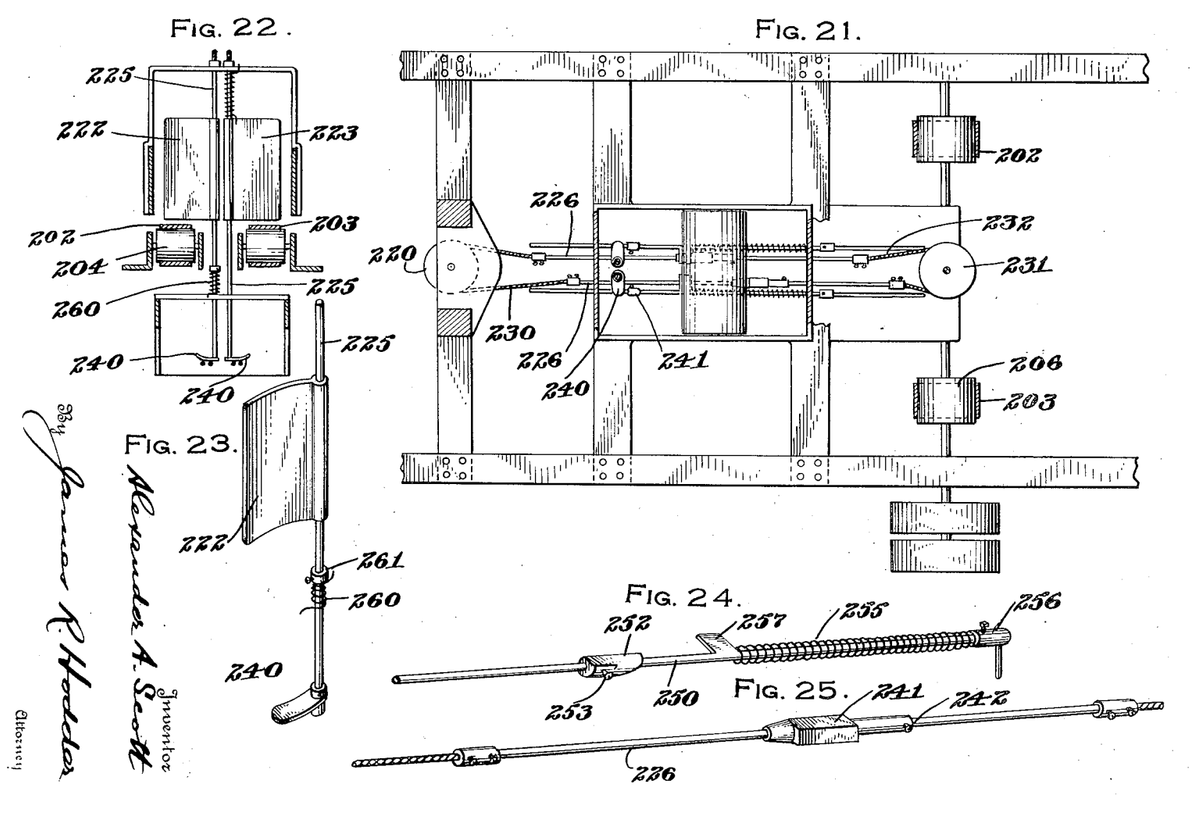

In Figs. 19 to 25 inclusive I have illustrated a modified form of switching device which can be utilized or applied in any desired switching point in connection with my apparatus and if desired can be utilized either for separating a single column of brick into a plurality, or vice versa. I have illustrated the same in the latter use. As shown in Fig. 19 columns 200 and 201 with belts 202 and 203 moving over supporting rolls 204 are provided substantially as already explained, and convey brick in the direction of the arrows, and switch same to a single column 205. A drive pulley 206 around which the belts are led is arranged with suitable guides to form the same to desired position. A switching belt 210 and suitable rollers which latter may be belted in combination with the channel or column 205 is arranged, this section 210 being supported by a plurality of rolls on a swinging frame 215, the latter secured on an upright support 216 pivoted at 217 and 218 to fixed parts of the adjacent frame. The forward part of this frame 215 is supported on a yoke 219 which is in turn attached eccentrically to the axle of a pulley 220. Partial rotation of this pulley 220 results in swinging the frame 215 and consequently the switching section 210 successively into and out of alinement of the columns 200 and 201. To effect this switching action by partial rotative movement of the pulley 220, I provide brick engaging switch members 222 and 223, positioned respectively in the paths of the brick coming down the columns 200 and 201. Each switching member or wing is secured to a shaft or spindle 225 (description of one will suffice for both), this shaft being suitably supported in fixed bearings as illustrated. The lower part of each shaft is adapted to engage stops on movable rods, these rods 226 being connected by the pulley 220 at one end by a coiled spring or rope 230 and at the other end to a pulley 231 by a coiled rope 232, the shaft of which pulley has a crank 233 to which is secured a coiled spring 234, the latter under normally contractile tension to force the same and the rod 226 in position to normally swing the switches 222 and 223 into brick engaging position in their respective columns. As the rods are rigidly held together around the pulleys 220 and 231, movement of one acts cooperatively to move the other rod, and these rods are successively moved through engagement of the lugs 240 on the bottom of each shaft 225 contacting with the blocks 241 on the rods 226. These blocks may be adjustably held in position by a set screw 242 as shown in Fig. 25.

In order to accentuate this switching movement and for the return of the wings 222 I provide a rod 250 having thereon lugs 252 adjustably secured thereto by set screws 253 adapted to be moved by a coiled spring 255 bearing between a fixed sleeve 256 and a lug 257 on the rods, whereby when the force of the brick against the wing 222 is released, the swinging movement of said wing by the passage of the brick compressing the spring 255, the same will return the wing 222 to normal outstanding position instantly and free of any movement of the rods 226 and pulleys 231 and 220. Thus the switch 210 is left in turned position while the wing 222 which acted to turn it, is returned into the path of its column and waiting for a successive movement. Meanwhile this switch can be turned back to the next column in case of the oncoming brick in said column prior to a preceding one in the first column. To still further aid in this retracting movement of the wings 222 I provide small coiled springs 260 around each spindle 225 with one end fixed in any adjacent part of the framework and the other to an adjustable collar 261 which will adjust the tension and provide the position therefor.

This arrangement permits the switch 210 to be turned in position for the column 200 for example and the wing 222 projecting into said column will either act to turn the switch 210 into receiving position, or will swing freely for passage of successive bricks after the switch 210 has been so turned, whereas a brick coming down the column 201 will automatically reset the switch 210 for receiving position for its column, and then the wing 223 will be returned without turning back the switch 210 for the other column. Thus each column has an independent switch controlling action, while the friction of the pulleys 220 and 231, with the encircling ropes 230 and 232, hold the switch in turned position, permitting the belt 270 to travel around the rollers on the switch and constitute a positive transporting means for the brick carried thereby. Guides 275 are provided at all suitable and desirable points to keep the brick from leaving the conveying belts.

While I have described this modified form of switching arrangement as operable by switching two columns into one, it will be appreciated that a reverse movement of operation will be readily feasible. The switch members 222 and 223 are equally capable of operation by the passage of brick in the reverse direction, and in combination with reversal of rotation of the pulleys, as well as in the switching device herein illustrated.

This modification enables a plurality of parallel rows, if already formed, as for instance 10, to be reduced to 9, when it is desired to set brick in a manner that will necessitate a plurality of uneven rows for the unit.

My invention is further described and defined in the form of claims as follows:

1. Apparatus for handling brick, which consists in the combination of a conveyor carrying successive brick continuously, a movable switch adapted to register with said conveyor in receiving relation and to deliver brick from the switch to a plurality of conveyors and automatic means operated by the passage of one brick to predetermine the setting of the switch for the succeeding brick.

2. Apparatus for handling brick, which consists in the combination of a conveyor carrying successive brick continuously, a movable switch adapted to register with said conveyor in receiving relation and to deliver brick from the switch to a plurality of conveyors and automatic means determined by the passage of a plurality of brick for the setting of the switch for subsequent brick.

3. A switching device for controlling the passage of a plurality of brick in successive movement, consisting of means projecting into the path of movement of the brick, and partially displaced therefrom, in combination with additional means moved into the line of travel by a passing brick to complete the switching action of a third brick, whereby the passage of two brick are required to set the switch for disalining a third brick, in combination with means resetting the switch to its original position by the passage of said third brick.

In testimony whereof, I have signed my name to this specification.

ALEXANDER A. SCOTT.